United States Patent
Laporte et al.

(10) Patent No.: US 10,440,660 B2
(45) Date of Patent: Oct. 8, 2019

(54) UPLINK SPECTRUM ANALYSIS TECHNIQUE FOR PASSIVE INTERMODULATION (PIM) DETECTION

(71) Applicant: Telefonaktiebolaget LM Ericsson (publ), Stockholm (SE)

(72) Inventors: Pierre-Andre Laporte, Gatineau (CA); Mark Wyville, Ottawa (CA)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 15/739,821

(22) PCT Filed: Jul. 8, 2015

(86) PCT No.: PCT/IB2015/055174
§ 371 (c)(1),
(2) Date: Dec. 26, 2017

(87) PCT Pub. No.: WO2017/006155
PCT Pub. Date: Jan. 12, 2017

(65) Prior Publication Data
US 2018/0368077 A1 Dec. 20, 2018

(51) Int. Cl.
*H04W 52/52* (2009.01)
*H04W 52/24* (2009.01)
(Continued)

(52) U.S. Cl.
CPC .......... *H04W 52/241* (2013.01); *H04B 1/109* (2013.01); *H04B 1/1027* (2013.01);
(Continued)

(58) Field of Classification Search
CPC . H04W 52/241; H04W 52/143; H04W 52/16; H04W 52/52; H04W 24/06;
(Continued)

(56) References Cited

U.S. PATENT DOCUMENTS 5,321,847 A 6/1994 Johnson, Jr.
5,937,011 A * 8/1999 Carney ..................... H04L 5/06
375/297

(Continued)

FOREIGN PATENT DOCUMENTS

EP 1 067 698 B1 11/2005
WO 2003030416 A1 4/2003
(Continued)

OTHER PUBLICATIONS

International Search Report & Written Opinion of the International Searching Authority dated Mar. 16, 2016 issued in corresponding PCT Application Serial No. PCT/IB2015/055174, consisting of 8-pages.

*Primary Examiner* — Hai V Nguyen
(74) *Attorney, Agent, or Firm* — Christopher & Weisberg, P.A.

(57) ABSTRACT

A method and system for identifying passive intermodulation, PIM, at a base station in a wireless communication system are disclosed. In some embodiments, a method includes measuring the noise floor in a radio frequency, RF, channel of an uplink carrier, the uplink carrier comprising a carrier transmitted from a wireless device to the base station. The method includes comparing the measured noise floor to a predetermined noise floor. The method also includes determining whether PIM is present based on a result of the comparison.

22 Claims, 10 Drawing Sheets

(51) Int. Cl.
  *H04B 1/10* (2006.01)
  *H04W 24/06* (2009.01)
  *H04W 24/08* (2009.01)
  *H04W 52/14* (2009.01)
  *H04W 52/16* (2009.01)
  *H04L 1/20* (2006.01)
  *H04W 24/00* (2009.01)

(52) U.S. Cl.
  CPC ........... *H04W 24/06* (2013.01); *H04W 24/08* (2013.01); *H04W 52/143* (2013.01); *H04W 52/16* (2013.01); *H04W 52/52* (2013.01); *H04L 1/20* (2013.01); *H04W 24/00* (2013.01)

(58) Field of Classification Search
  CPC ..... H04W 24/08; H04B 1/1037; H04B 1/109; G01R 23/20
  USPC ................................................ 455/501, 67.13
  See application file for complete search history.

(56) References Cited

U.S. PATENT DOCUMENTS

| | | | | |
|---|---|---|---|---|
| 6,201,993 B1* | 3/2001 | Kruse | ................ | A61N 1/37211 |
| | | | | 128/903 |
| 6,374,096 B1* | 4/2002 | Parr | ...................... | H04W 52/24 |
| | | | | 342/359 |
| 8,058,880 B2* | 11/2011 | Bradley | ............. | H04B 17/0085 |
| | | | | 324/520 |
| 8,369,812 B2 | 2/2013 | Lehman | | |
| 8,903,324 B1* | 12/2014 | Bradley | ............... | H04B 17/345 |
| | | | | 455/67.11 |
| 8,983,454 B2* | 3/2015 | Bevan | .................. | H04B 1/1027 |
| | | | | 455/423 |
| 8,995,517 B2* | 3/2015 | Delforce | ............ | H04B 17/0085 |
| | | | | 375/220 |
| 9,438,285 B2* | 9/2016 | Wyville | ................. | H04B 17/26 |
| 9,461,697 B2* | 10/2016 | Yu | .......................... | H04B 1/525 |
| 9,532,252 B2* | 12/2016 | Hariharan | ........... | H04W 24/10 |
| 9,614,557 B1* | 4/2017 | Mayer | .................... | H04B 17/13 |
| 9,673,847 B1* | 6/2017 | Mayer | .................... | H04B 17/13 |
| 9,894,623 B2* | 2/2018 | Dussmann | ........... | H03G 3/3042 |
| 9,979,408 B2* | 5/2018 | Mayer | .................... | H03L 7/0891 |
| 10,039,022 B2* | 7/2018 | Tsui | ...................... | H04W 24/08 |
| 10,182,409 B2* | 1/2019 | Dussmann | ........... | H03G 3/3042 |
| 10,187,098 B1* | 1/2019 | Tsui | ....................... | H04B 1/109 |
| 2002/0012404 A1* | 1/2002 | Ahn | ...................... | H03F 1/3229 |
| | | | | 375/297 |
| 2003/0232600 A1* | 12/2003 | Montgomery | ......... | H01Q 1/246 |
| | | | | 455/67.11 |
| 2009/0322421 A1* | 12/2009 | Mueller | ................ | H03F 1/0261 |
| | | | | 330/124 R |
| 2010/0164504 A1* | 7/2010 | Bradley | .................... | H04B 3/46 |
| | | | | 324/520 |
| 2013/0182753 A1* | 7/2013 | Delforce | ............ | H04B 17/0085 |
| | | | | 375/228 |
| 2013/0310023 A1* | 11/2013 | Bevan | .................. | H04B 1/1027 |
| | | | | 455/423 |
| 2014/0153418 A1* | 6/2014 | Hariharan | ............. | H04W 24/10 |
| | | | | 370/252 |
| 2014/0161005 A1* | 6/2014 | Laurent-Michel | ..... | H04B 1/525 |
| | | | | 370/281 |
| 2014/0378067 A1* | 12/2014 | Au | ........................ | H04W 24/08 |
| | | | | 455/67.11 |
| 2015/0087242 A1* | 3/2015 | Bain | .................. | H04B 17/3913 |
| | | | | 455/73 |
| 2015/0145528 A1* | 5/2015 | Yeo | ......................... | G01R 29/10 |
| | | | | 324/629 |
| 2015/0222371 A1* | 8/2015 | Afkhami | ................ | H04B 17/16 |
| | | | | 455/67.13 |
| 2015/0244414 A1* | 8/2015 | Yu | .......................... | H04B 1/525 |
| | | | | 455/73 |
| 2015/0249965 A1* | 9/2015 | Dussmann | ........... | H03G 3/3042 |
| | | | | 455/501 |
| 2015/0318882 A1* | 11/2015 | Wyville | ................. | H04B 17/26 |
| | | | | 370/252 |
| 2015/0358144 A1* | 12/2015 | Fleischer | ............ | H04B 17/104 |
| | | | | 370/242 |
| 2016/0028497 A1* | 1/2016 | Holt | .................. | H04B 17/0085 |
| | | | | 375/228 |
| 2016/0322995 A1* | 11/2016 | Bevan | .................. | H04B 1/1027 |

FOREIGN PATENT DOCUMENTS

| | | |
|---|---|---|
| WO | 2014012585 A1 | 1/2014 |
| WO | 2014083361 A1 | 6/2014 |
| WO | 2014085345 A1 | 6/2014 |

* cited by examiner (Prior Art)
FIG. 1

UPLINK SPECTRUM ANALYSIS TECHNIQUE FOR PASSIVE INTERMODULATION (PIM) DETECTION

CROSS-REFERENCE TO RELATED APPLICATIONS

This application is a Submission Under 35 U.S.C. § 371 for U.S. National Stage Patent Application of International Application Number: PCT/IB2015/055174, filed Jul. 8, 2015 entitled "UPLINK SPECTRUM ANALYSIS TECHNIQUE FOR PASSIVE INTERMODULATION (PIM) DETECTION" the entirety of which is incorporated herein by reference.

TECHNICAL FIELD

The present disclosure generally relates to wireless communications and in particular to methods and systems for passive intermodulation (PIM) detection.

BACKGROUND

Figure 1:
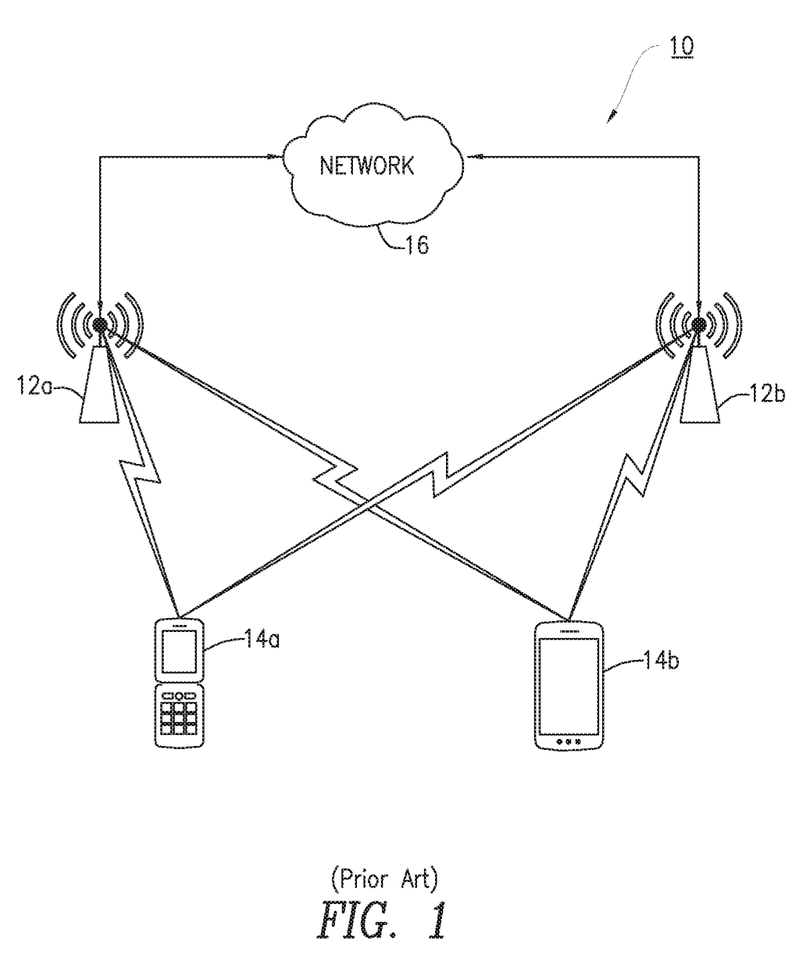
FIG. 1 is a diagram of a portion of a wireless communication system.

Passive Intermodulation (PIM) interferences, discussed below, are undesirable but are present in wireless communication systems. FIG. 1 shows a portion of a typical wireless communication system 10 from which PIM may arise. FIG. 1 shows two base stations 12a and 12b, referred to herein collectively as base stations 12. Each base station 12 may serve a plurality of mobile devices 14a and 14b, referred to herein collectively as mobile devices 14, which may include mobile phones, laptop computers, tablet computers, other user equipment (UE) devices, etc. Each base station is in communication with a network 16 which may include the Internet and the Public Switched Telephone Network (PSTN). In a typical wireless communication system there are many base stations and many wireless devices. Each base station 12 may have multiple antennas and multiple transmitters and receivers. Further, more than one base station can be located at the same location, referred to herein as a cellular site.

PIM interferences are a relatively new problem which occurs in crowded spectrum in a wireless communication system. PIM is a form of intermodulation distortion that occurs in passive components such as antennas, cables, connectors or duplexers with two or more high power input signals. PIM can also be generated by rust, corrosion, loose connections, dirt and oxidation. When PIM is present, two or more signals interfere to cause sum and difference signals. Self-generated PIM is caused by a base station's own signals interfering with one another. PIM may also arise when a base station's signals interfere with signals from external sources. Further, PIM may result due to interference of external signals.

The PIM interferences that are observed at cellular sites are usually generated from two or more high power carriers which are mixed together in a non-linear passive component, such as rusty metal, located in the vicinity of the transmit antennas. Those intermodulation products are especially harmful when they land in one of the uplink receive channels since they deteriorate the signal to interference plus noise ratio (SINR) as well as the link budget.

Known solutions to PIM detection such as common public radio interface (CPRI) sniffing and two tones tests require human intervention and external equipment. Moreover, those methods assume that the PIM interferences are (1) only caused by the transmitted signals and they ignore the fact that (2) the intermodulation products could also be created by mixing the own transmitted signals with some signals from the environment, or alternatively, (3) that they could be created by signals from the surrounding environment only.

SUMMARY

Present embodiments advantageously provide a method and system for identifying passive intermodulation, PIM, at a base station in a wireless communication system. In some embodiments, a method includes measuring the noise floor in a radio frequency, RF, channel of an uplink carrier, the uplink carrier being a carrier received from a wireless device by the base station during normal operation. The method includes comparing the measured noise floor to a predetermined noise floor. The method also includes determining whether PIM is present based on a result of the comparison.

According to this aspect, in some embodiments, PIM is determined to be present when the measured noise floor exceeds the predetermined noise floor by a specified amount. In some embodiments, measuring the noise floor includes measuring the noise floor at an uplink carrier edge region, the edge region including at least one of a part of the RF channel of the uplink carrier where no signal energy is transmitted and a part of an adjacent RF channel of another uplink carrier where no signal energy is transmitted. In some embodiments, the measuring of the noise floor at the uplink carrier edge region is performed continually during an operational state of the base station. In some embodiments, measuring the noise floor comprises suppressing one or more downlink carriers associated with the uplink carrier. In some embodiments, measuring the noise floor comprises transmitting artificial traffic on a first downlink carrier that cause no uplink signal to be transmitted on the uplink carrier and repeating the measuring, comparing and determining In some embodiments, the repetition of the measuring, comparing and determining are performed after operation of a power amplifier for transmitting the artificial traffic on the first downlink carrier becomes substantially linear.

According to another aspect, a base station is provided to detect passive intermodulation, PIM. The base station includes processing circuitry such as a processor, a memory and some dedicated hardware resources for the receiver chain. The memory has instructions that, when executed by the processor, configure the processor and the dedicated hardware resources to: measure a noise floor of a radio frequency, RF, channel of an uplink carrier, the uplink carrier being a carrier received from a wireless device by the base station during normal operation; compare the measured noise floor to a predetermined noise floor; and determine whether PIM is present based on a result of the comparison.

According to this aspect, in some embodiments, PIM is determined to be present when the measured noise floor exceeds the predetermined noise floor by a specified amount. In some embodiments, the base station includes a power detector configured to measure the noise floor at an uplink carrier edge region, the edge region including at least one of a part of the RF channel of the uplink carrier where no signal energy is transmitted and a part of an adjacent RF channel of another uplink carrier where no signal energy is transmitted. In some embodiments, the measuring of the noise floor at the uplink carrier edge region is performed continually during an operational state of the base station. In some embodiments, the base station includes a transmit controller configured to suppress one or more downlink carriers associated with the uplink carrier. In some embodiments, the transmit controller is configured to cause transmission of artificial traffic on a first downlink carrier that cause no uplink signal to be received on the uplink carrier and the processor is configured to repeat the measuring, comparing and determining In some embodiments, the processor is configured to repeat the measuring, comparing and determining after operation of a power amplifier for transmitting the artificial traffic on the first downlink carrier becomes substantially linear.

According to another aspect, a base station is provided to detect passive intermodulation, PIM. The base station includes a power detection module configured to measure a noise floor of a radio frequency, RF, channel of an uplink carrier, the uplink carrier being a carrier received from a wireless device by the base station during normal operation. The base station also includes a comparison module configured to compare the measured noise floor to a predetermined noise floor; and a passive intermodulation, PIM, determination module, configured to determine whether PIM is present based on a result of the comparison.

According to this aspect, in some embodiments, PIM is determined to be present when the measured noise floor exceeds the predetermined noise floor by a specified amount. In some embodiments, the power detection module measures the noise floor at an uplink carrier edge region, the edge region including at least one of a part of the RF channel of the uplink carrier where no signal energy is transmitted and a part of an adjacent RF channel of another uplink carrier where no signal energy is transmitted. In some embodiments, the measuring of the noise floor at the uplink carrier edge region is performed continually during an operational state of the base station. In some embodiments, the base station further includes a transmit control module configured to suppress one or more downlink carriers associated with the uplink carrier. In addition or in the alternative the transmit control module may be configured to cause transmission of artificial traffic on a first downlink carrier that causes no uplink signal to be received on the uplink carrier, and the power detection module, the comparison module and the PIM determination module are configured to respectively repeat to measure, compare and determine. In some embodiments, the power detection module, the comparison module and the PIM determination module are configured to respectively repeat to measure, compare and determine after operation of a power amplifier for transmitting the artificial traffic on the first downlink carrier becomes substantially linear.

According to yet another aspect, embodiments include a network node configured to detect passive intermodulation, PIM. The network node includes a receiver configured to receive a measurement of a noise floor of a radio frequency, RF, channel of an uplink carrier, the uplink carrier comprising a carrier received from a wireless device to a base station. The network node includes processing circuitry that may include a processor and a memory. The memory includes instructions that, when executed by the processor, configure the processor to compare the measured noise floor to a predetermined noise floor; and determine whether PIM is present based on a result of the comparison.

According to this aspect, in some embodiments, PIM is determined to be present when the measured noise floor exceeds the predetermined noise floor by a specified amount. In some embodiments, the network node includes a transmit controller configured to shut off one or more downlink carriers associated with the uplink carrier. In some embodiments, the transmit controller is configured to cause transmission of artificial traffic on a first downlink carrier that causes no uplink signal to be received on the uplink carrier and the and the receiver and processor are configured to respectively repeat to receive, compare and determine.

BRIEF DESCRIPTION OF THE DRAWINGS

A more complete understanding of embodiments described herein, and the attendant advantages and features thereof, will be more readily understood by reference to the following detailed description when considered in conjunction with the accompanying drawings wherein.

DETAILED DESCRIPTION

Before describing in detail exemplary embodiments that are in accordance with the present disclosure, it is noted that the embodiments reside primarily in combinations of apparatus components and processing steps related to passive intermodulation detection. Accordingly, the system, device and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements.

Although terminology from Third Generation Partnership Project (3GPP) Long Term Evolution (LTE) communication systems is used in this disclosure to describe some embodiments, this should not be seen as limiting the scope of the embodiments to only the aforementioned system. Other wireless systems, including not only wideband code division multiple access (WCDMA), WiMax, ultra mobile broadband (UMB) and global system for mobile communications (GSM), but also, other current or future 4G or 5G networks and beyond, may also benefit from exploiting the subject matter covered within this disclosure.

Some embodiments provide for detection of PIM and whether detected PIM is self-generated, generated by interference between a base station's own signal and external signals, or generated entirely by external signals. Some embodiments enable detection of PIM by observing the signal in an edge region at an edge of a carrier channel to determine if the signal is at the specified noise floor of the receiver or is above the specified noise floor of the receiver. A three step PIM detection procedure is described herein. The first two steps may be performed as part of a cell site bring-up procedure, and the third step involves monitoring when the cell site is operational.

Figure 2:
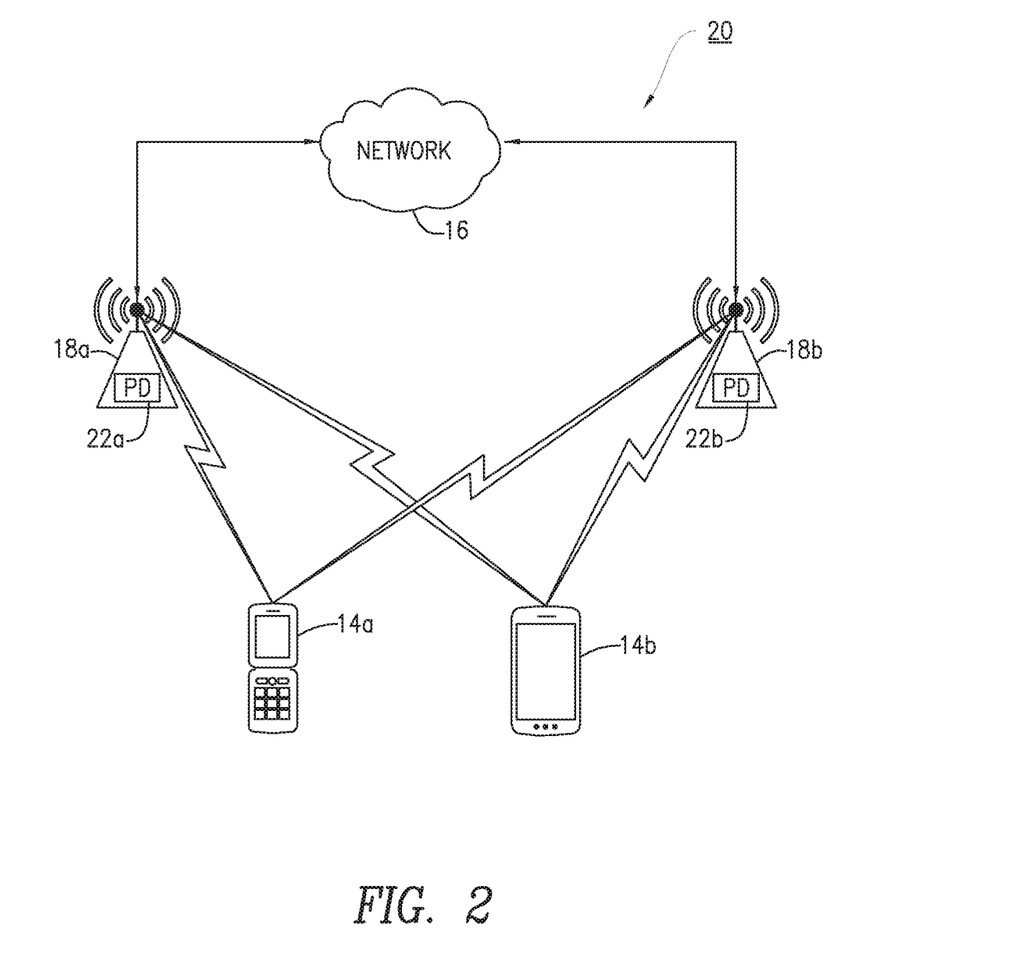
FIG. 2 is a wireless communication system having passive intermodulation (PIM) detection units at the base stations.

FIG. 2 is a block diagram of a wireless communication system 20 having wireless devices 14a and 14b, referred to collectively herein as wireless devices 14, network 16, and base stations 18a and 18b, referred to collectively herein as base stations 18. Each base station 18, or each cellular site at which one or more base stations are located, is equipped with a PIM detector 22, such as PIM detector 22a and PIM detector 22b. As discussed below in detail, the PIM detector 22 determines a presence of PIM based on a comparison of a measured signal level to a specified noise floor.

Figure 3:
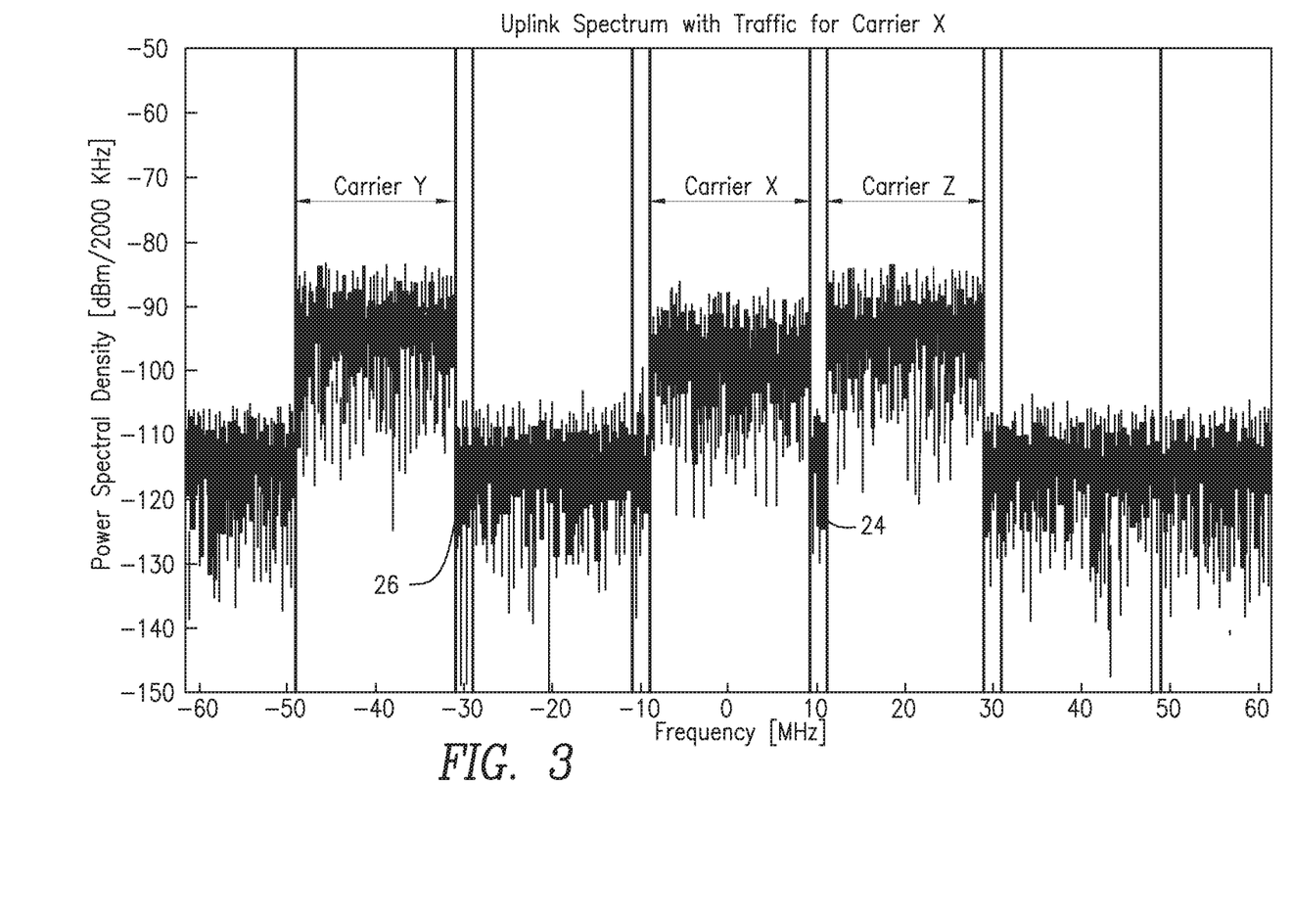
FIG. 3 is a plot of an uplink spectrum with traffic being carried by carriers X, Y and Z and with no PIM.

FIG. 3 is a plot of an example uplink spectrum received at a base station 18 that is free from PIM but carries communication traffic, i.e., data signals from a wireless device 14 to the base station 18. The spectrum in the example of FIG. 3 has three LTE carriers, each having a bandwidth of 20 Megahertz (MHz). The three LTE carriers, X, Y and Z may belong to one operator or more than one operator. At a band edge of each carrier is a gap or edge region 24 that includes part of the RF channel of an uplink carrier where no signal energy is transmitted and a part of the RF channel of an adjacent carrier where no signal energy is transmitted. A typical LTE carrier transmits using about 90% of the allocated bandwidth. Therefore, for a 20 MHz carrier, only about 18 MHz are actually used, leaving a gap of about 2 MHz between used carrier bands in this particular example. Notice that within the edge region 24, the signal is normally expected to be at the level of the noise floor 26 of the receiver of the base station 18.

Figure 4:
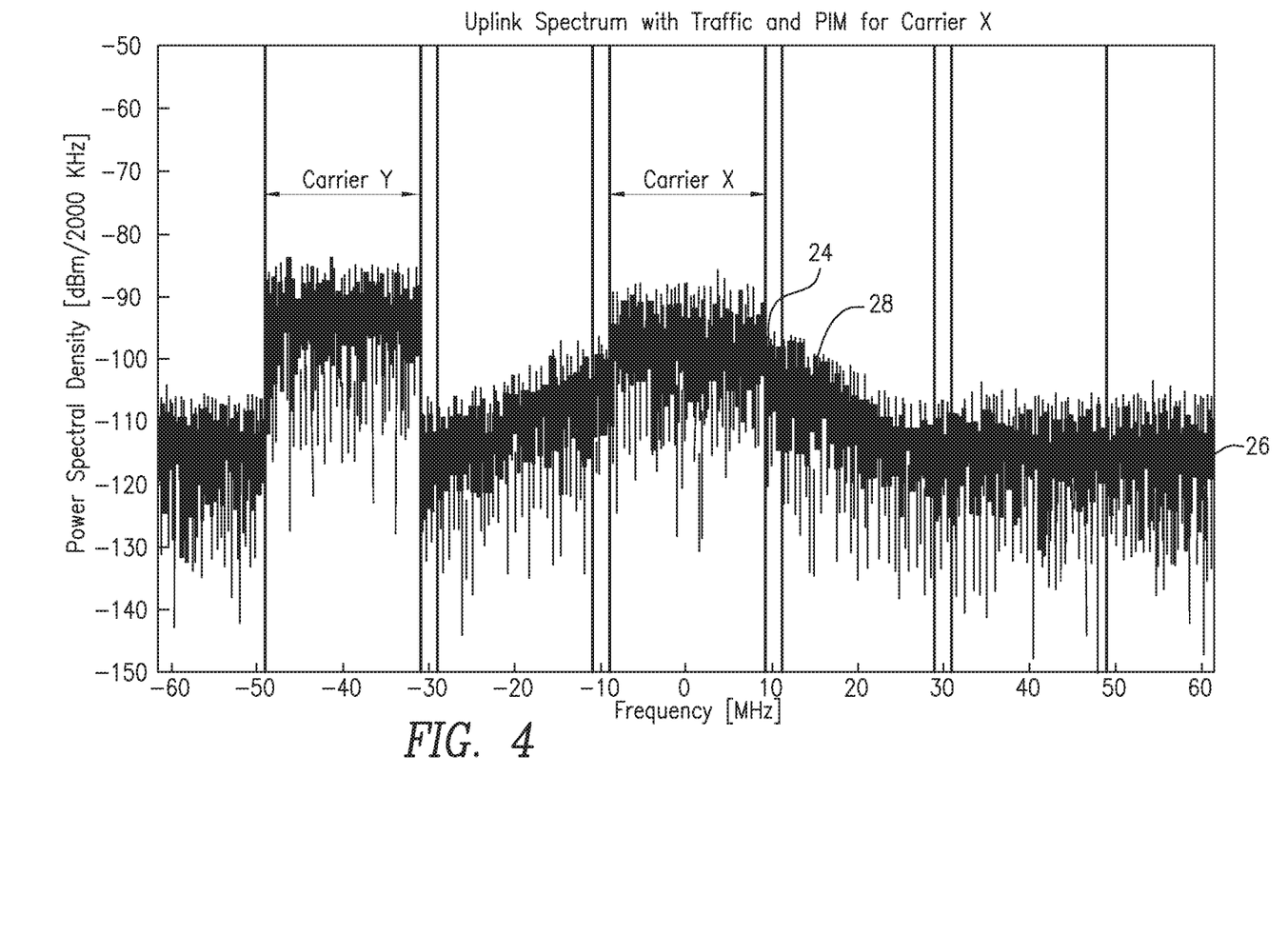
FIG. 4 is a plot of an uplink spectrum with traffic on carriers X and Y and PIM associated with carrier X.

FIG. 4 is a plot of another example of an uplink spectrum received at a base station 18 when there is PIM present and when traffic is carried on carrier X. The signal to interference plus noise ratio (SINR) is greatly reduced due to the presence of PIM because PIM increases the level of interference within the channel. Note that in the edge region 24, the signal level is substantially above the noise floor 26, indicating the presence of PIM 28. In particular, in the plot of FIG. 4, the noise floor in the edge regions 24 has increased by roughly 10 dB from −115 dBm/200 kHz to −105 dBm/200 kHz. This corresponds to approximately 10 dB SINR reduction. Thus, presence of signal energy above the noise floor 26 in the edge region 24 may be used as an indicator of PIM.

Figure 5:
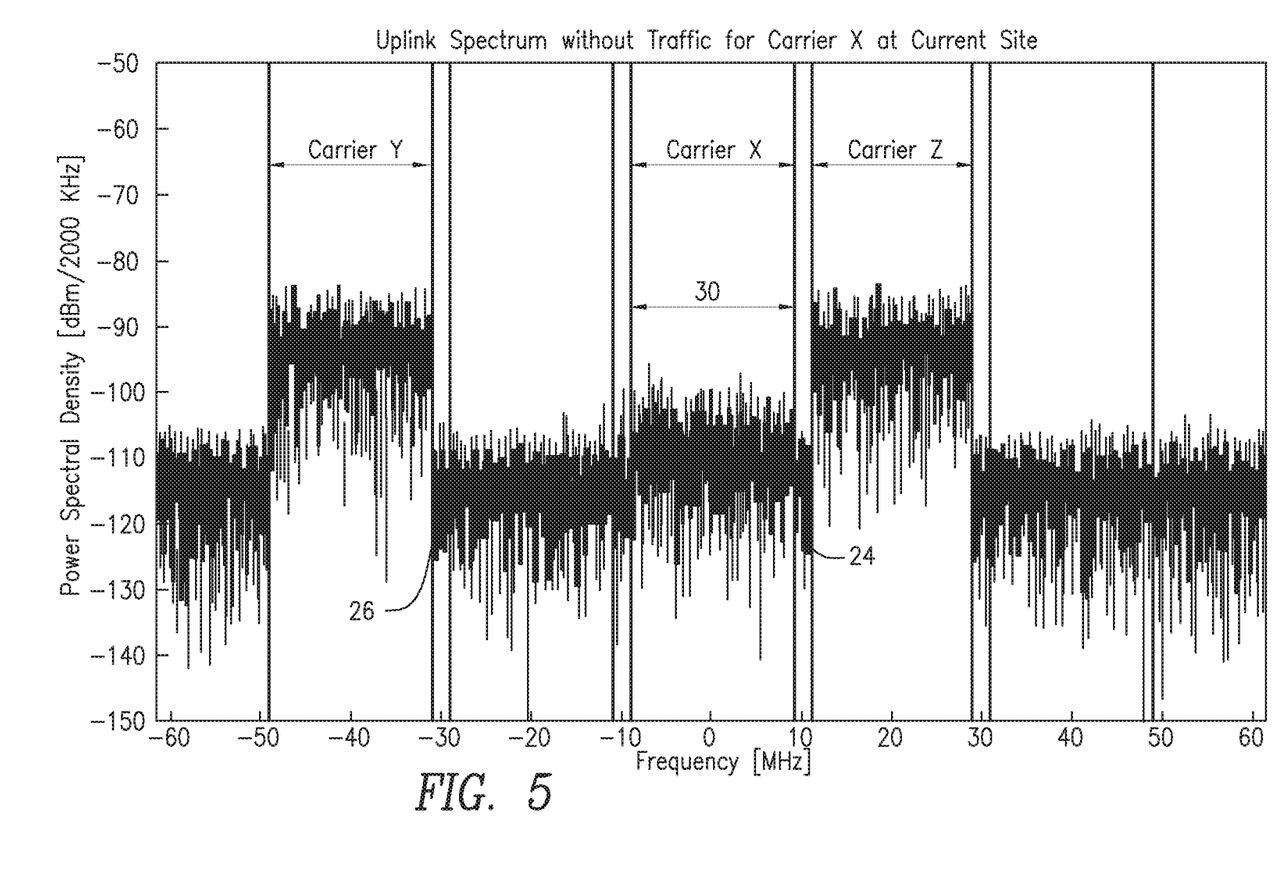
FIG. 5 is plot of an uplink spectrum with no traffic for carrier X.

During a first step of a cell site bring-up procedure, validation of the presence of PIM caused by external sources may be made. To validate the presence or absence of externally generated PIM, the system measures the noise floor in the receive uplink channel when no cell specific traffic signal is present. This measurement can be accomplished by shutting off the downlink path, i.e., the communication path from the base station 18 to the wireless device 14, so that the wireless devices 14 do not create any uplink traffic, i.e., traffic in the communication path from the wireless device 14 to the base station 18, in that frequency interval. The measured noise floor is then compared to a predetermined value such as the receiver noise floor which is known from receiver specifications. Shutting off the downlink path for the whole site also has another effect, namely eliminating self-generated PIM from the uplink band if there are any. FIG. 5 shows the uplink spectrum when no corresponding downlink and no cell specific uplink traffic are present for carrier X. If the environment is PIM-free, the measured noise floor in the uplink channel of interest 30 and in the edge region 24 next to the uplink channel 30 should be very close to the specified receiver noise floor. In practice, the signal level in the region of carrier X may be slightly above the noise floor 26 due to signal energy coming from adjacent cellular sites operating in the same RF channels.

Figure 6:
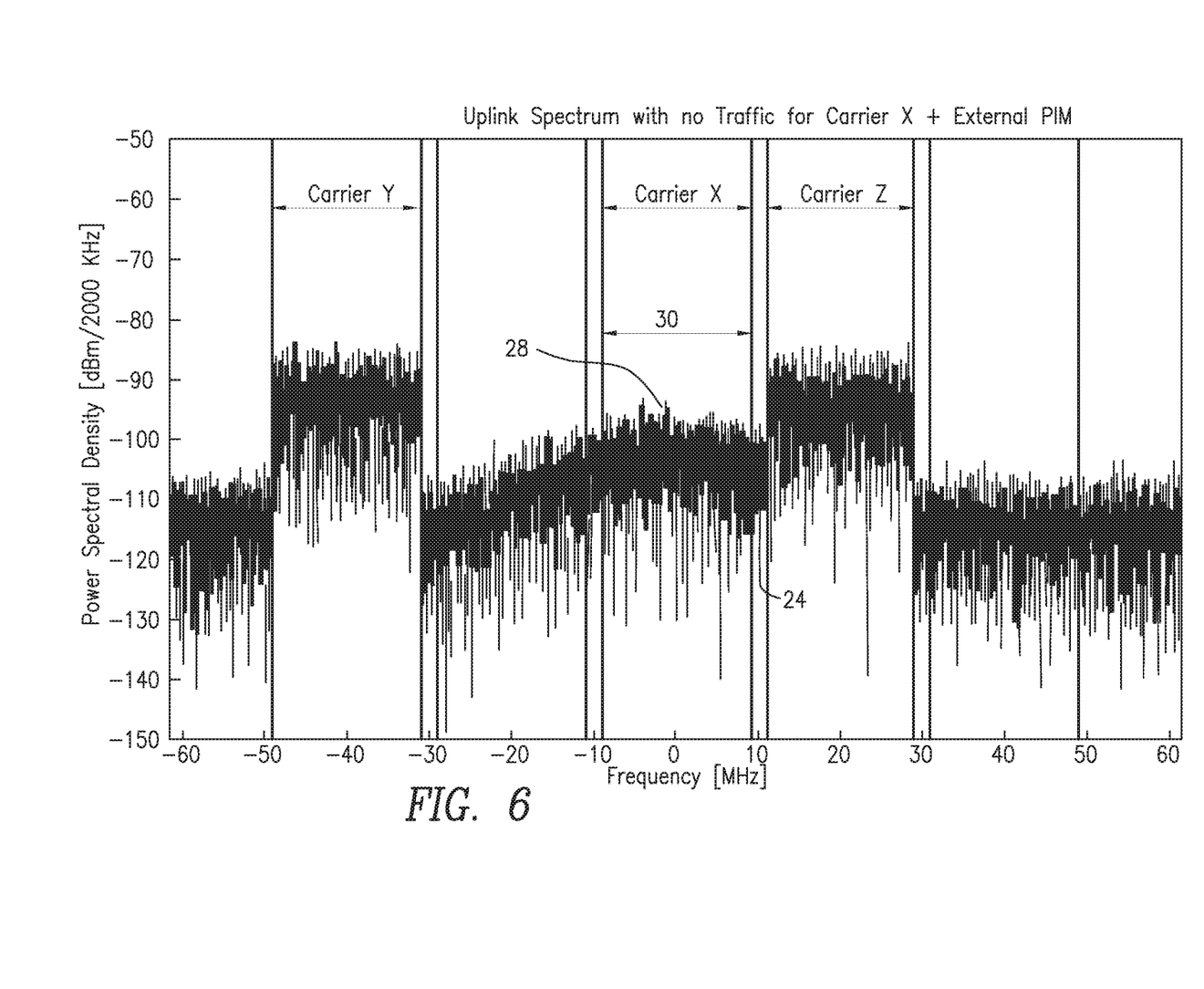
FIG. 6 is a plot of an uplink spectrum with no traffic for carrier X and with a higher noise floor due to PIM.

When externally generated PIM from equipment of competitors is present, the noise floor will be larger than shown in FIG. 5. Thus, as shown in FIG. 6, when external PIM is present, the signal in the edge region 24 and the uplink channel 30 is significantly above the noise floor 26 and the presence of PIM 28 is indicated. Consequently, remedial measures may be taken to eliminate this PIM.

In a second step of the cell site bring-up procedure, validation of the presence or absence of self-generated PIM may be made. Such validation may include activating fully loaded "artificial" downlink carriers, one at a time, and then measuring the noise floor for the uplink carriers of interest and in the edge regions next to them every time a new downlink carrier is added. The downlink carriers used at this step of the procedure are configured to carry "artificial traffic and control signals," so that the wireless devices do not create corresponding uplink traffic. Artificial traffic is traffic generated to simulate real traffic, but that does not cause responsive traffic from the wireless devices. The power of those artificial carriers is also boosted by filling-up all of the radio resources—called resource blocks in the LTE standard—so that potential PIM problems are easier to observe. In this step, each time a downlink carrier is added, the system may wait for the power amplifier (PA) to be linearized by the pre-distortion (PD) subsystem of the PA before the noise floor measurement can be taken in the uplink channels. Indeed, every time a new carrier is introduced, the PA will start exhibiting some non-linearities. Thus, some system level synchronization mechanisms may be employed to ensure that the uplink noise measurement only occurs after the pre-distortion subsystem has confirmed that the downlink signal is linear.

In the situation where self-generated PIMs exist in the environment, resulting from either mixing with the base station's own signal or other signals from the environment, a spectrum similar to the one presented in FIG. 6 will appear in the uplink channel, which will increase the measured uplink noise floor. At this moment, the operator will know exactly which downlink carrier created the PIM problem, and also if it was created by mixing with its own signal or if it resulted from mixing with a signal from the environment, which could be the signal from another operator.

In the situation where PIM interferences are observed, an alarm should be raised by the system and further investigations made. However, when the site is PIM-free, the system is now ready to handle real traffic.

After the cell site bring-up procedure is completed and the site is found to be PIM-free, at least in the uplink channels of interest to the operator, normal operation ensues and the energy in the channel edge regions 24 are monitored and compared to the specified noise floor of the receiver. PIM may occur with the system over time. For example, an operator or an operator's competitor may introduce a new carrier at this cell site or a nearby cell site which creates PIM interference in one of the operator's uplink channels. This should lead to detection of an increased signal in the edge region, e.g., edge region 24. In one embodiment, the above steps described for cell site bring-up can be repeated to determine which carriers are creating the PIM. These procedures can also indicate whether the PIM is self-generated, generated by a downlink carrier of the base station mixing with external signals or whether the PIM is from external sources only. Once this is known, appropriate measures can be taken such as the addition of hardware and/or software modules for PIM cancellation.

Figure 7:
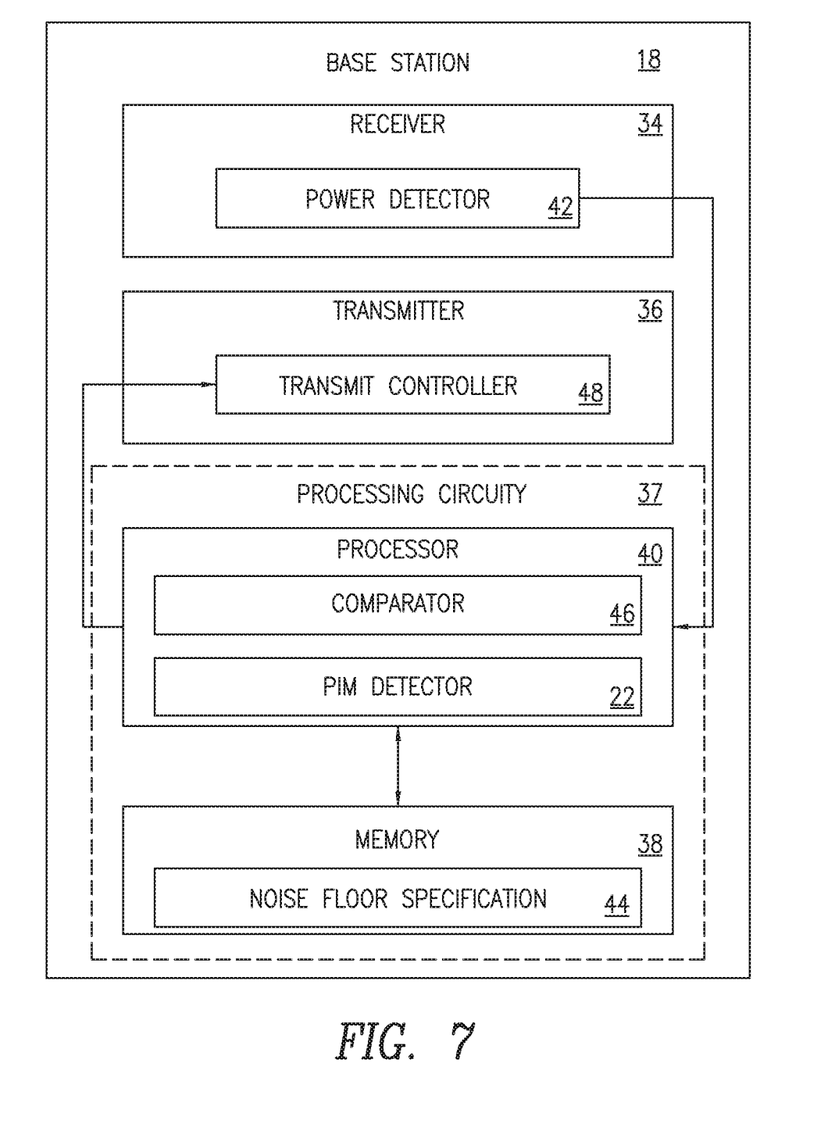
FIG. 7 is a block diagram of a base station configured to perform PIM detection.

FIG. 7 is a block diagram of a base station 18 configured to perform PIM detection procedures via a PIM detection module 22, as discussed above. The base station 18 includes a receiver 34, a transmitter 36, and processing circuitry 37. In one embodiment, the processing circuitry 37 includes a memory 38 and a processor 40. The receiver 34 receives uplink signals and measures the received uplink signal power using a power detector 42. The power detector 42 may measure power in the edge region between uplink channels and send this measurement to the processor 40 which implements a PIM detector 22 to determine if PIM is present. In particular, a noise floor specification 44 stored in the memory 38, specifies a noise level of the receiver 34 and a comparator 46, implemented by the processor 40, compares the specified noise level to the power detected by the power detector 42. If the power detected in the edge region by the power detector 42 exceeds the specified noise level stored by the noise floor specification 44 by a specified amount, the PIM detector 22 determines whether PIM is present. During the second phase of the site bring-up procedure described above, a transmit controller 48 of the transmitter 36 is instructed by the processor 40 to turn on downlink carriers one at a time so that PIM can be observed and the carrier that contributes to the PIM can be identified.

Although FIG. 7 shows the PIM detector 22 as part of the processor 40, implementations of the PIM detector 22 are not limited solely to the arrangement shown in FIG. 7. It is contemplated that the PIM detector 22 can also be implemented in hardware, such as an application specific integrated circuit (ASIC), programmable gate array (PGA) and the like. Similarly, in other embodiments, the memory 38 can be implemented as random access memory (RAM), for example, and the comparator 46 can be implemented in hardware, such as an application specific integrated circuit (ASIC), programmable gate array (PGA) and the like. In general, the memory and processor may be included in processing circuitry, such as processing circuitry 37, that is configured to perform the above-described functions.

Figure 8:
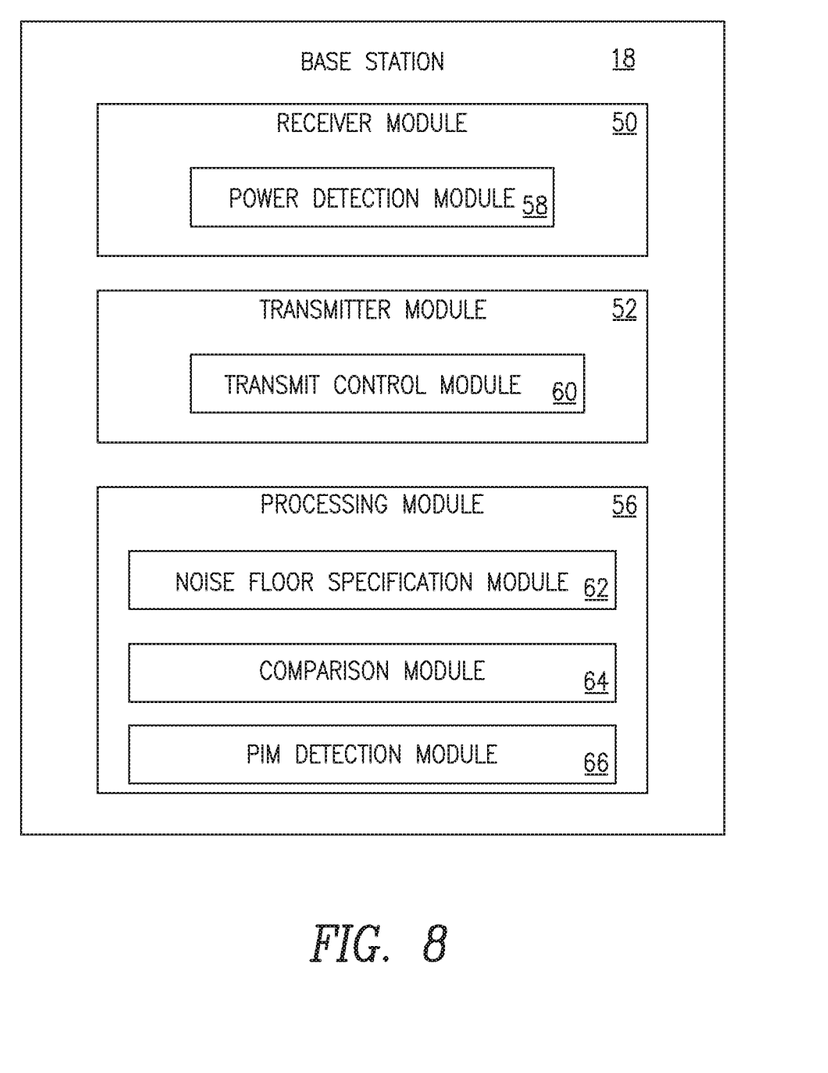
FIG. 8 is a block diagram of an alternative embodiment of a base station configured to perform PIM detection.

Referring to FIG. 8, another block diagram of a base station 18 configured to perform PIM detection procedures is illustrated. The base station 18 includes a receiver module 50, a transmitter module 52 and a processing module 56. The receiver module 50 includes a power detection module 58 configured to measure a noise floor of a radio frequency (RF) channel of an uplink carrier, the uplink carrier being a carrier received from a wireless device by the base station 18 during normal operation. The transmitter module 52 may include a transmit control module 60 configured to selectively turn on downlink carriers. The processing module 56 includes a comparison module 64 configured to compare the measured noise floor to a predetermined noise floor stored in the noise floor specification module 62. The PIM detection module 66 is configured to determine whether PIM is present based on the comparison performed by the comparison module 64.

Figure 9:
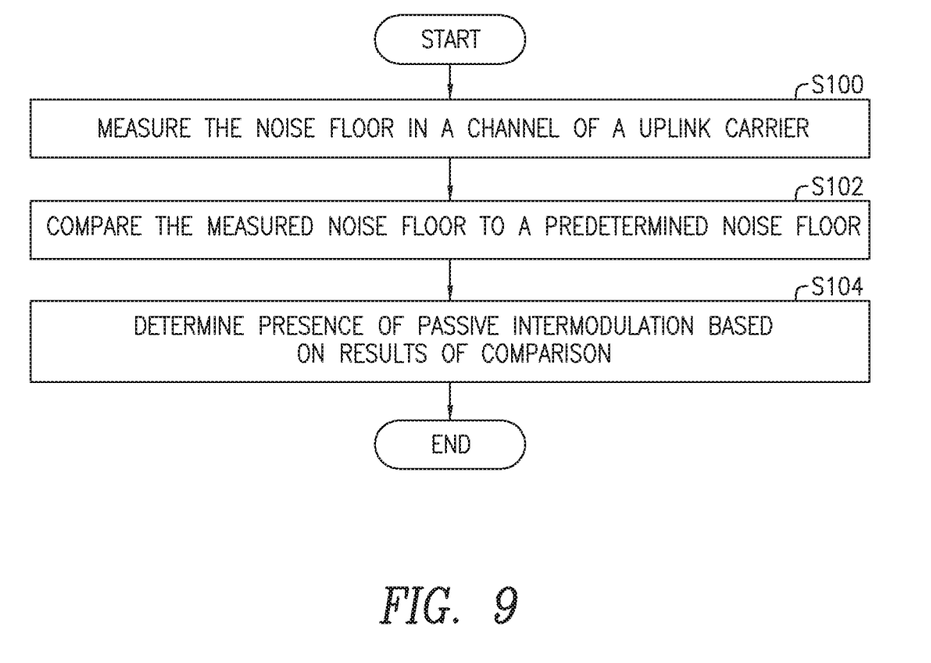
FIG. 9 is a flowchart of an exemplary process for detecting PIM.

FIG. 9 is a flowchart of an exemplary process for detecting the presence of PIM, such as at a base station 18 or cell site. Of note, although the process is described with reference to a single node such as a base station, the disclosure is not limited to such. It is contemplated that the processes described herein can be performed at a node other than a base station 18 or cell site, and can be distributed among different nodes. For example, the measurements can be performed at one node and used by another node to determine PIM presence Similarly, one node can perform PIM detection a part of the cell site bring up, and another used to perform PIM detection once the system is running As is shown in FIG. 9, the process includes measuring the noise floor in an RF channel of an uplink carrier (block S100). The measured noise floor is compared to a predetermined noise floor (block S102). The presence of PIM is determined based on the comparison (block S104). For example, PIM may be determined to be present when the measured noise floor exceeds the predetermined noise floor by a specified amount. In some embodiments, the measurement of the noise floor occurs at an uplink carrier edge region that includes at least one of a part of the RF channel of the uplink carrier and a part of an adjacent RF channel of another uplink carrier where no signal energy is transmitted. In some embodiments, the measurement of the noise floor in the edge region is performed continually during an operational state of the base station.

The noise floor of the edge region can be measured during a cell site bring-up process and during an operational state of a base station. During the cell site bring-up process, the transmit controller 48 of the base station 18 may shut off or suppress one or more downlink carriers and selectively turn on downlink carriers one at a time, and measuring the noise floor in the edge region, each time another downlink carrier is turned on. Also, during the cell site bring-up process, the transmit controller 48 may cause transmission of artificial traffic on a downlink carrier that causes no uplink signal to be received on an uplink carrier in order to determine presence of self-generated PIM. In some embodiments, the measuring, comparing and determining are performed after operation of a power amplifier for transmitting the artificial traffic becomes substantially linear.

Figure 10:
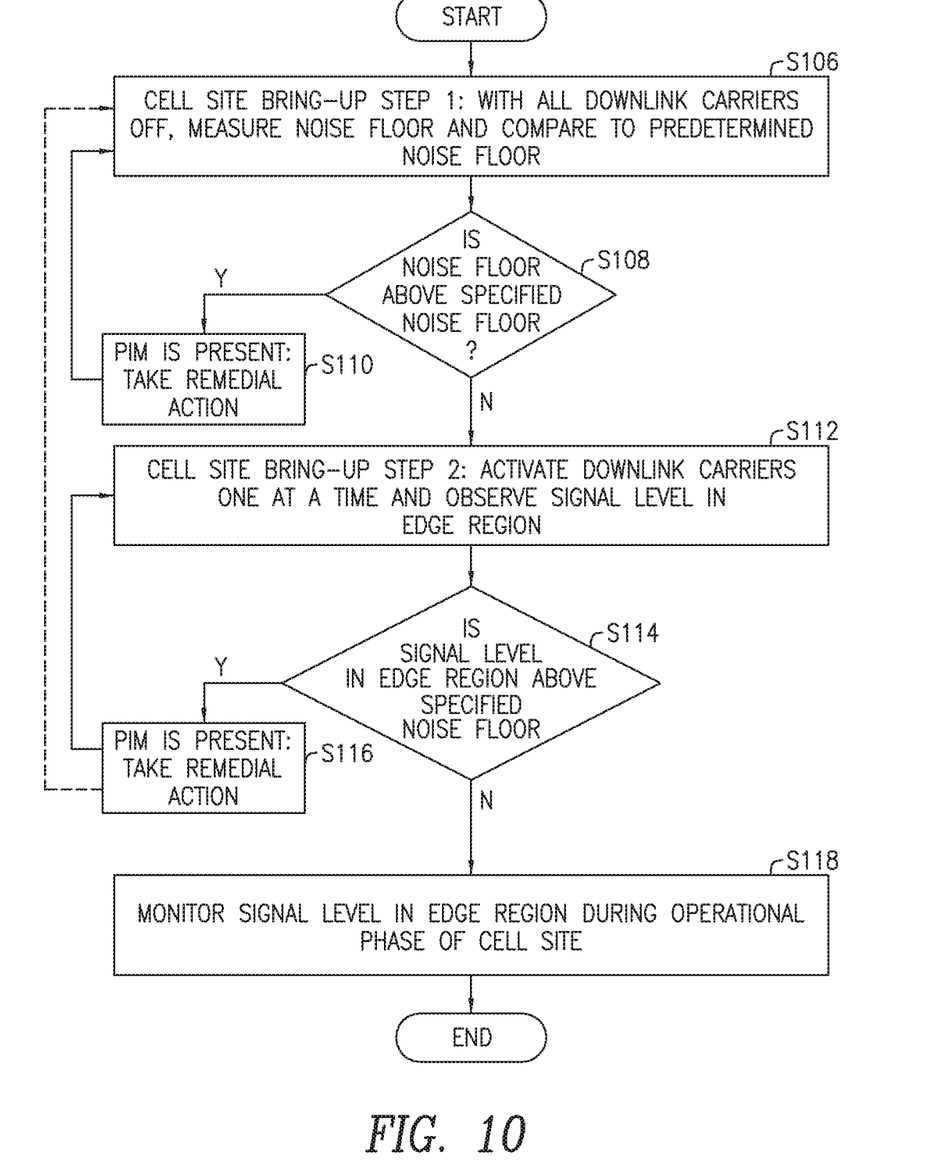
FIG. 10 is a flowchart of an exemplary process for detecting PIM in three phases.

FIG. 10 is flowchart of another exemplary process for detecting PIM. During a cell site bring-up procedure a first step of measuring the noise floor, using the power detector 42, with all downlink carriers off and comparing the measurement to the receiver noise floor specification is performed (block S106). The process includes determining if the measured noise floor is above the receiver noise floor specification (block S108). If the measured noise floor is above the receiver noise floor specification, PIM is determined to be present and remedial action is to be taken (block S110). Otherwise, a second step of the cell site bring-up procedure of activating downlink carriers one by one and observing the signal level in the edge region is performed (block S112). Then it is determined whether the signal level in the edge region is above the specified noise floor (block S114). If the signal level in the edge region is above the specified noise floor, PIM is determined to be present and remedial action is to be taken (block S116). Upon taking remedial action, the process may return to step 2 (block S112). In an optional embodiment, the process may return to step 1 (block S106). Otherwise, the signal level in the edge region is monitored during an operation state of the cell site (block S118).

Advantages of some embodiments include a low cost solution for PIM detection which does not require any additional hardware such as an extra receiver chain and it only uses the baseband uplink signal in the uplink channels of interest. Also, the computational cost is relatively low so that this solution can be implemented in mainstream platform products. Solutions described herein include a procedure for cellular site bring-up which can detect whether PIM interferences are self-generated or if they are generated by mixing a cellular sites own signals with signals from the environment or if they are generated by external sources only, such as from competitor's equipment. The solution provides an early indication of potential PIM problems on a given site as a first line of defense. Additional PIM cancellation/detection hardware and software modules can be sold separately for customers having PIM problems.

Embodiments can be realized in hardware, or a combination of hardware and software. Any kind of computing system, or other apparatus adapted for carrying out the methods described herein, is suited to perform the functions described herein. A typical combination of hardware and software could be a specialized computer system, having one or more processing elements and a computer program stored on a storage medium that, when loaded and executed, controls the computer system such that it carries out the methods described herein. The present disclosed arrangements and methods can also be embedded in a computer program product, which comprises all the features enabling the implementation of the methods described herein, and which, when loaded in a computing system is able to carry out these methods. Storage medium refers to any volatile or non-volatile storage device.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form.

It will be appreciated by persons skilled in the art that the present embodiments are not limited to what has been particularly shown and described herein above. In addition, unless mention was made above to the contrary, it should be noted that all of the accompanying drawings are not to scale. A variety of modifications and variations are possible in light of the above teachings without departing from the scope, which is limited only by the following claims.

What is claimed is:

1. A method for identifying passive intermodulation, PIM, at a base station in a wireless communication system, the method comprising:
   measuring the noise floor in a radio frequency, RF, channel of an uplink carrier, the uplink carrier being a carrier received from a wireless device by the base station during normal operation, measuring the noise floor including measuring the noise floor at an uplink carrier edge region, the edge region including at least one of a part of the RF channel of the uplink carrier where no signal energy is transmitted and a part of an adjacent RF channel of another uplink carrier where no signal energy is transmitted;
   comparing the measured noise floor to a predetermined noise floor; and
   determining whether PIM is present based on a result of the comparison.

2. The method of claim 1, wherein PIM is determined to be present when the measured noise floor exceeds the predetermined noise floor by a specified amount.

3. The method of claim 1, wherein the measuring of the noise floor at the uplink carrier edge region is performed continually during an operational state of the base station.

4. The method of claim 1, wherein measuring the noise floor comprises suppressing one or more downlink carriers associated with the uplink carrier.

5. The method of claim 4, wherein measuring the noise floor comprises transmitting artificial traffic on a first downlink carrier that cause no uplink signal to be received on the uplink carrier and repeating the measuring, comparing and determining.

6. The method of claim 5, wherein the repetition of the measuring, comparing and determining are performed after operation of a power amplifier for transmitting the artificial traffic on the first downlink carrier becomes substantially linear.

7. A base station configured to detect passive intermodulation, PIM, the base station comprising:
   processing circuitry, the processing circuitry including a processor, and
   a memory, the memory containing instructions that, when executed by the processor, configure the processor to:
      measure a noise floor of a radio frequency, RF, channel of an uplink carrier, the uplink carrier being a carrier received from a wireless device by the base station during normal operation, the measuring including measuring the noise floor at an uplink carrier edge region, the edge region including at least one of a part of the RF channel of the uplink carrier where no signal energy is transmitted and a part of an adjacent RF channel of another uplink carrier where no signal energy is transmitted;
      compare the measured noise floor to a predetermined noise floor; and
      determine whether PIM is present based on a result of the comparison.

8. The base station of claim 7, wherein PIM is determined to be present when the measured noise floor exceeds the predetermined noise floor by a specified amount.

9. The base station of claim 7, wherein the measuring of the noise floor at the uplink carrier edge region is performed continually during an operational state of the base station.

10. The base station of claim 7, further comprising a transmit controller configured to suppress one or more downlink carriers associated with the uplink carrier.

11. The base station of claim 7, further comprising a transmit controller configured to cause transmission of artificial traffic on a first downlink carrier that cause no uplink signal to be received on the uplink carrier, and wherein the processor is configured to repeat to measure, compare and determine.

12. The base station of claim 11, wherein the processor is configured to repeat to measure, compare and determine after operation of a power amplifier for transmitting the artificial traffic on the first downlink carrier becomes substantially linear.

13. A base station configured to detect passive intermodulation, PIM, the base station comprising:
   a power detection module configured to measure a noise floor of a radio frequency, RF, channel of an uplink carrier, the uplink carrier being a carrier received from a wireless device by the base station during normal operation, the measuring including measuring the noise floor at an uplink carrier edge region, the edge region including at least one of a part of the RF channel of the uplink carrier where no signal energy is transmitted and a part of an adjacent RF channel of another uplink carrier where no signal energy is transmitted;
   a comparison module configured to compare the measured noise floor to a predetermined noise floor; and
   a passive intermodulation, PIM, determination module, configured to determine whether PIM is present based on a result of the comparison.

14. The base station of claim 13, wherein PIM is determined to be present when the measured noise floor exceeds the predetermined noise floor by a specified amount.

15. The base station of claim 13, wherein the measuring of the noise floor at the uplink carrier edge region is performed continually during an operational state of the base station.

16. The base station of claim 13, further comprising a transmit control module configured to suppress one or more downlink carriers associated with the uplink carrier.

17. The base station of claim 13, further comprising a transmit control module configured to cause transmission of artificial traffic on a first downlink carrier that causes no uplink signal to be received on the uplink carrier, and wherein the power detection module, the comparison module and the PIM determination module are configured to respectively repeat to measure, compare and determine.

18. The base station of claim 17, wherein the power detection module, the comparison module and the PIM determination module are configured to respectively repeat to measure, compare and determine after operation of a power amplifier for transmitting the artificial traffic on the first downlink carrier becomes substantially linear.

19. A network node configured to detect passive intermodulation, PIM, the network node comprising:
 a receiver configured to receive a measurement of a noise floor of a radio frequency, RF, band of an uplink carrier, the uplink carrier comprising a carrier transmitted from a wireless device to a base station, the measurement including a measurement of the noise floor at an uplink carrier edge region, the edge region including at least one of a part of the RF channel of the uplink carrier where no signal energy is transmitted and a part of an adjacent RF channel of another uplink carrier where no signal energy is transmitted; and
 processing circuitry, the processing circuitry including a processor and a memory, the memory containing instructions that, when executed by the processor, configure the processor to:
  compare the measured noise floor to a predetermined noise floor; and
  determine whether PIM is present based on a result of the comparison.

20. The network node of claim 19, wherein PIM is determined to be present when the measured noise floor exceeds the predetermined noise floor by a specified amount.

21. The network node of claim 19, further comprising a transmit controller to shut off one or more downlink carriers associated with the uplink carrier.

22. The network node of claim 19, further comprising a transmit controller configured to cause transmission of artificial traffic on a first downlink carrier that causes no uplink signal to be received on the uplink carrier, and wherein the receiver and processor are configured to respectively repeat to receive, compare and determine.

* * * * *